(12) United States Patent
Blasco Serrano et al.

(10) Patent No.: US 10,348,444 B2
(45) Date of Patent: Jul. 9, 2019

(54) SPEED DEPENDENT TRANSMISSION FORMAT FOR VEHICULAR TRANSMISSION

(71) Applicant: Telefonaktiebolaget LM Ericsson (publ), Stockholm (SE)

(72) Inventors: Ricardo Blasco Serrano, Stockholm (SE); Stefano Sorrentino, Solna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/314,333

(22) PCT Filed: Sep. 21, 2016

(86) PCT No.: PCT/SE2016/050883
§ 371 (c)(1),
(2) Date: Nov. 28, 2016

(87) PCT Pub. No.: WO2017/052453
PCT Pub. Date: Mar. 30, 2017

(65) Prior Publication Data
US 2017/0288806 A1     Oct. 5, 2017

Related U.S. Application Data

(60) Provisional application No. 62/233,028, filed on Sep. 25, 2015.

(51) Int. Cl.
*H04L 1/00* (2006.01)
*H04W 4/70* (2018.01)
(Continued)

(52) U.S. Cl.
CPC ............ *H04L 1/0006* (2013.01); *H04L 67/12* (2013.01); *H04W 4/027* (2013.01); *H04W 4/70* (2018.02);
(Continued)

(58) Field of Classification Search
CPC ..... H04W 4/027; H04W 48/04; H04W 48/18; H04W 36/32; H04L 1/0006
(Continued)

(56) References Cited

U.S. PATENT DOCUMENTS

| 7,822,159 B2 | 10/2010 | Fujita et al. |
| 2005/0185733 A1 | 8/2005 | Tolli et al. |

(Continued)

FOREIGN PATENT DOCUMENTS

| DE | 10 2007 009504 A1 | 8/2008 |
| DE | 102007009504 A1 | 8/2008 |

(Continued)

OTHER PUBLICATIONS

International Search Report and Written Opinion dated Dec. 19, 2016 for International Application Serial No. PCT/SE2016/050883, International Filing Date: Sep. 21, 2016 consisting of 13-pages.
(Continued)

*Primary Examiner* — Ayodeji O Ayotunde
(74) *Attorney, Agent, or Firm* — Christopher & Weisberg, P.A.

(57) ABSTRACT

A method and system for selecting a transmission format of a first wireless device in a wireless communication network are provided. According to one aspect, a method for selecting a transmission format includes determining a speed of the first wireless device, selecting a transmission format based on the speed of the first wireless device.

35 Claims, 6 Drawing Sheets

(51) Int. Cl.
  *H04W 4/02* (2018.01)
  *H04W 72/04* (2009.01)
  *H04L 29/08* (2006.01)
  *H04W 4/04* (2009.01)
  *H04W 4/06* (2009.01)
  *H04W 28/18* (2009.01)
  *H04W 92/18* (2009.01)

(52) U.S. Cl.
  CPC ......... *H04W 72/048* (2013.01); *H04L 1/0038* (2013.01); *H04L 2001/0093* (2013.01); *H04W 4/02* (2013.01); *H04W 4/046* (2013.01); *H04W 4/06* (2013.01); *H04W 28/18* (2013.01); *H04W 92/18* (2013.01)

(58) Field of Classification Search
  USPC .................. 455/569.1–570, 76, 99, 67.11
  See application file for complete search history.

(56) References Cited

U.S. PATENT DOCUMENTS

| | | | |
|---|---|---|---|
| 2006/0135150 A1* | 6/2006 | Oh ................... | H04W 36/32 455/425 |
| 2007/0211624 A1 | 9/2007 | Schmidt et al. | |
| 2008/0107221 A1 | 5/2008 | Yamanaka et al. | |
| 2008/0159238 A1* | 7/2008 | Niwano ............. | H04W 52/267 370/336 |
| 2010/0023232 A1 | 1/2010 | Isaji et al. | |
| 2010/0058101 A1 | 3/2010 | Shahid et al. | |
| 2010/0094532 A1* | 4/2010 | Vorona ............... | G08G 1/0104 701/119 |
| 2012/0058763 A1* | 3/2012 | Zhao ................... | H04W 48/20 455/434 |
| 2012/0122515 A1* | 5/2012 | Han .................... | H04W 36/32 455/525 |
| 2012/0319902 A1 | 12/2012 | Floch | |
| 2013/0142177 A1 | 6/2013 | Nentwig | |
| 2013/0343343 A1* | 12/2013 | Shahid ................ | H04W 48/18 370/331 |
| 2014/0192793 A1 | 7/2014 | Abraham et al. | |
| 2014/0301331 A1 | 10/2014 | Niewczas | |
| 2015/0009949 A1 | 1/2015 | Khoryaev et al. | |
| 2015/0215767 A1* | 7/2015 | Siomina ............. | H04W 8/02 455/435.2 |
| 2015/0230194 A1 | 8/2015 | Yang et al. | |
| 2015/0245397 A1* | 8/2015 | Sachs ................. | H04W 76/023 455/426.1 |
| 2015/0319725 A1 | 11/2015 | Marshall | |
| 2016/0142994 A1 | 5/2016 | Luo et al. | |
| 2016/0278061 A1* | 9/2016 | Peng ................... | H04L 43/16 |
| 2016/0356876 A1 | 12/2016 | Lazik et al. | |
| 2016/0381670 A1* | 12/2016 | Kim .................... | H04L 5/0055 370/329 |
| 2017/0034842 A1* | 2/2017 | Xu ....................... | H04W 4/00 |
| 2017/0086028 A1* | 3/2017 | Hwang ............... | H04W 4/027 |
| 2017/0288806 A1 | 10/2017 | Blasco Serrano et al. | |
| 2018/0124707 A1* | 5/2018 | Lee .................... | H04W 52/10 |
| 2018/0146491 A1 | 5/2018 | Kim et al. | |
| 2018/0176891 A1 | 6/2018 | Kim et al. | |

FOREIGN PATENT DOCUMENTS

| | | |
|---|---|---|
| EP | 1983783 A1 | 10/2008 |
| EP | 2549807 A1 | 1/2013 |
| EP | 3113560 A1 | 1/2017 |
| JP | 2007306120 A | 11/2007 |
| JP | 200933340 A | 2/2009 |
| RU | 2511526 C2 | 10/2014 |
| WO | 2007045505 A1 | 4/2007 |
| WO | 2011151662 A1 | 12/2011 |
| WO | 2015080510 A1 | 6/2015 |
| WO | 2015139320 A1 | 9/2015 |
| WO | 2015172666 A1 | 11/2015 |
| WO | 2017052320 A1 | 3/2017 |
| WO | 2017052453 A1 | 3/2017 |

OTHER PUBLICATIONS

International Search Report and Written Opinion dated Jun. 19, 2017 for International Application Serial No. PCT/SE2016/051069, International Filing Date: Nov. 1, 2016 consisting of 23-pages.
3GPP TSG RAN WG1 Meeting#78 R1-142937, Title: "Comparison of Hierarchical and Flat synchronization procedures", Source: CEWiT, Agenda Item: 7.2.3.3.3, Document for: Discussion, Location and Date: Dresden, Germany Aug. 18-22, 2014 consisting of 7-pages.
3GPP TSG RAN WG1 Meeting #78bis R1-144020, Title: "Discussion on UE procedures for D2DSS transmission and reception," Source: LG Electronics, Agenda Item: 7.2.1.1.6, Document for: Discussion and Decision, Location and Date: Ljubljana, Solvenia Oct. 6-10, 2014 consisting of 3-pages.
3GPP TSG-RAN WG4 #72 R4-146428, Title: "Further Discussion on LC_MTC RLM parameters setup," Source: Ericsson, Agenda Item: 7.3.4, Document for: Discussion, Location and Date: Singapore Oct. 6-10, 2014 consisting 5-pages.
U.S. Office Action dated Mar. 7, 2018 for U.S. Appl. No. 15/315,266, consisting of 15-pages.
International Preliminary Report on Patentability dated Nov. 30, 2017 for International Application No. PCT/SE2016/050883 filed on Sep. 21, 2016, consisting of 9-pages.
Australian Examination Report for dated Jul. 12, 2018 for Application No. 2016327702, consisting of 5-pages.
U.S. Office Action dated Aug. 6, 2018, for U.S. Appl. No. 15/315,266, filed Nov. 30, 2016, consisting of 16-pages.
U.S. Notice of Allowance dated Mar. 12, 2019 for U.S. Appl. No. 15/315,266, filed Nov. 30, 2016, consisting of 10-pages.
Russian Office Action and Translation dated Feb. 5, 2019, for Application No. 2018115209, filed on Sep. 21, 2016, consisting of 15-pages.
Japanese Office Action and English Translation for Japanese Patent Application No. 2018-513442 dated Mar. 1, 2019, consisting of 4-pages.
3GPP TR 22.885 V1.0.0; 3rd Generation Partnership Project; Technical Specification Group Services and System Aspects; Study on LTE Support for V2X Services (Release 14); Sep. 2015, consisting of 43-pages.

* cited by examiner (Prior Art)
FIG. 1

SPEED DEPENDENT TRANSMISSION FORMAT FOR VEHICULAR TRANSMISSION

CROSS-REFERENCE TO RELATED APPLICATIONS

This application is a Submission Under 35 U.S.C. § 371 for U.S. National Stage Patent Application of International Application Number: PCT/SE2016/050883, filed Sep. 21, 2016 entitled "SPEED DEPENDENT TRANSMISSION FORMAT FOR VEHICULAR TRANSMISSION," which claims priority to U.S. Provisional Application No. 62/233,028, filed Sep. 25, 2015, entitled "SPEED DEPENDENT TRANSMISSION FORMAT FOR VEHICULAR TRANSMISSION," the entirety of both which are incorporated herein by reference.

TECHNICAL FIELD

This disclosure relates to wireless communication and in particular, to a method and device for speed dependent transmission format for vehicular transmission to provide resource management of radio communication networks with the participation of vehicles.

BACKGROUND

It is estimated that by 2020 there will be some 33 million automotive vehicles sold annually with built-in wireless connectivity, generating more than 163 million terabytes of data each year via their dozens of on-board cameras and sensor technologies. When shared across a wireless network, this data can be utilized by vehicles to give them an awareness of road conditions beyond the reach of their sensors, and thus enable the driver or the vehicle itself to better plan driving maneuvers. Vehicle to Vehicle (V2V) communications is a subset of device to device (D2D) wireless technology designed to allow automobiles to "talk" to each other.

Figure 1:
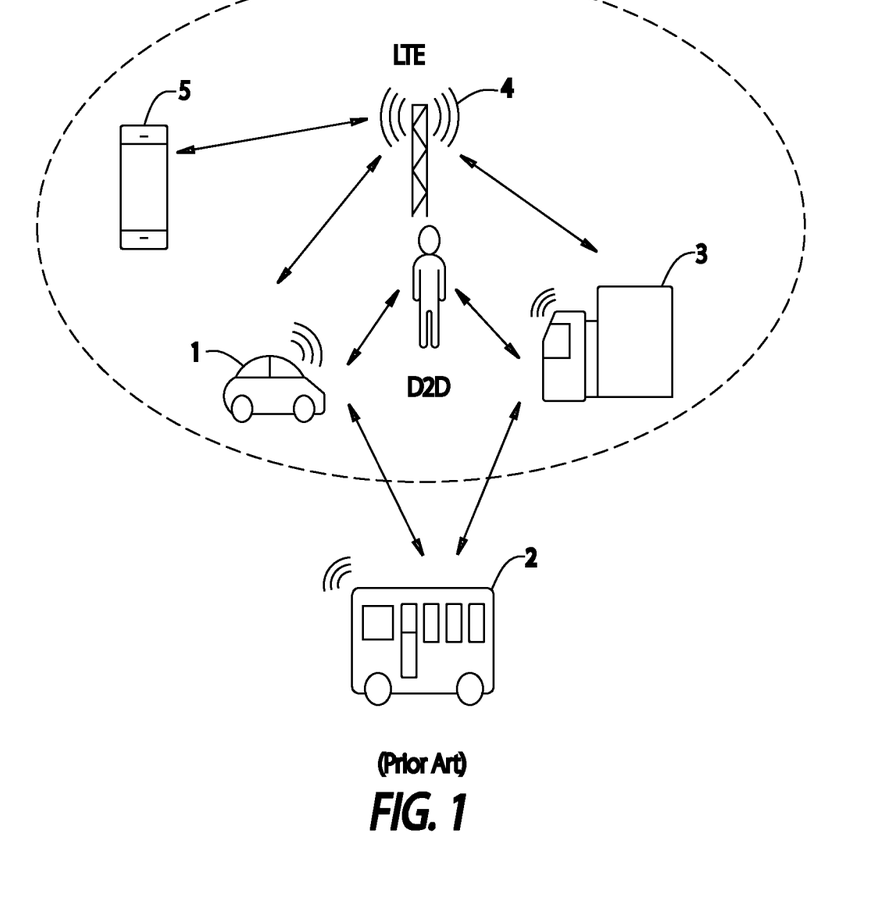
FIG. 1 is a block diagram of wireless communication system having device to device and vehicle to vehicle communications.

One configuration of device to device (D2D) and vehicle to vehicle (V2V) communication is shown in FIG. 1, where three vehicles 1, 2 and 3 may be in communication with each other and may also be in communication with a base station such as an LTE base station 4, which may be in communication with another wireless device 5.

Release 12 of the Long Term Evolution (LTE) wireless communication standard has been extended to support device to device (D2D) communications features targeting both commercial and public safety applications. Some applications enabled by Rel-12 LTE include device discovery, where a device is able to sense the proximity of another device and associated applications by broadcasting and detecting discovery messages that carry device and application identities. Another application consists of direct communication based on physical channels terminated directly between devices.

One potential extension for device to device communication includes support of V2x communication (Vehicle to "anything"), where "x" includes any combination of direct communication between vehicles, pedestrians and infrastructure. V2x communications may enable forward collision warning, traffic queue warning, vulnerable road user alerts, do not pass warnings, curve speed warnings, blind intersection warnings, emergency vehicle alerts, etc.

V2x communications may carry both non-safety and safety information, where each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

CAM: The Co-operative Awareness Message (CAM) is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. The availability of a CAM message is checked every 100 ms, yielding a maximum detection latency requirement of <=100 ms for most messages. In other words, the CAM must be less than or equal to 100 ms. However, the latency requirement for pre-crash sensing warning is 50 ms.

DENM: The Decentralized Environmental Notification Message (DENM) is event-triggered, such as by braking, and the availability of a DENM message is also checked every 100 ms, and the requirement of maximum latency is <=100 ms.

The package size of CAM and DENM messages varies from 100+ to 800+ bytes and the typical size is about 300 bytes. The message is supposed to be detected by all vehicles in proximity. The SAE (Society of Automotive Engineers) has also defined the Basic Safety Message (BSM) for dedicated short range communication (DSRC) with various messages sizes defined. According to the importance and urgency of the messages, the BSMs are further classified into different priorities.

Link adaptation is used for maximizing the link spectral efficiency for a given propagation condition. Typical link adaptation protocols are closed loop, i.e., they are based on some measurement at the receiving device of transmit signal from a transmitter device and some signaling, e.g., a channel quality index (CQI) feedback or a recommended transmission format, from the receiver device to the transmitter device.

In V2x scenarios, it will often be impractical to establish a closed-loop protocol for dynamic link adaptation. The reasons include the fact that many V2x topologies are one-to-many and the feedback load would be too large. Another reason is that many V2x services require very low latency, incompatible with the latency incurred by a practical feedback protocol.

Therefore, it is unpractical to perform link adaptation in V2x communication based on feedback from receivers.

SUMMARY

Some embodiments advantageously provide a method and system for selecting a transmission format of a first wireless device in a wireless communication network. According to one aspect, a method for use in a wireless device of selecting a transmission format of a first wireless device in a wireless communication network, the method comprising determining a speed of the first wireless device, and selecting a transmission format for the first wireless device based on the speed of the first wireless device.

According to this aspect, in some embodiments, the method further includes transmitting one of a message and a data packet using the selected transmission format. In some embodiments, the transmitting is one of communicating, broadcasting and direct communicating. In some embodiments, the speed of the first wireless device is an absolute speed of the first wireless device. In some embodiments, selecting a transmission format based on the speed of the first wireless device includes selecting a transmission format based on the absolute speed of the first wireless device. In some embodiments, the method further includes determining a relative speed between the first wireless device and a second wireless device to which the first wireless device communicates based on the determined speed of the first wireless device. In some embodiments, selecting a transmission format based on the speed of the first wireless device includes selecting a transmission format based on the relative speed. In some embodiments, the determined relative speed is the speed of the first wireless device plus an offset speed. In some embodiments, the determined relative speed is a constant multiplied by the speed of the first wireless device. In some embodiments, the determination of relative speed depends on a type of transmission. In some embodiments, when the type of transmission is point-to-multipoint transmission, the determination of relative speed corresponds to a speed of the first wireless device plus an offset that is based on a predetermined speed of one or more other wireless devices including the second wireless device. In some embodiments, the selection of the transmission format is further based on one of an application and a service provided by the first wireless device. In some embodiments, the transmission format is selected by at least one of a rule and a table. In some embodiments, the selection of the transmission format is further based on a packet size of a prospective transmission. In some embodiments, the selection of the transmission format is further based on a carrier frequency of the first wireless device. In some embodiments, the selection of the transmission format is further based on a radio measurement directly obtained by one of the first wireless device and a third wireless device other than a second wireless device. In some embodiments, the selected transmission format is at least one of a transport block size, a size of packets to be transmitted, a modulation and coding scheme, an amount of physical resources, a number of resource blocks, a number of transmission subframes, a number of retransmissions and an antenna mapping. In some embodiments, the first wireless device is one of a vehicle, part of a vehicle and in a vehicle. In some embodiments, the wireless communication network is a device to device, D2D, communication network.

According to another aspect is provided, a first wireless device for use in a wireless communication network, the first wireless device being configured to select a transmission format, the first wireless device comprising processing circuitry configured to determine a speed of the first wireless device, and select a transmission format for the first wireless device based on the speed of the first wireless device.

According to this aspect, in some embodiments, a transmitter is configured to transmit one of a message and a data packet using the selected transmission format. In some embodiments, the speed of the first wireless device is an absolute speed of the first wireless device. In some embodiments, selecting a transmission format based on the speed of the first wireless device includes selecting a transmission format based on the absolute speed of the first wireless device. In some embodiments, the processing circuitry is further configured to determine a relative speed between the first wireless device and a second wireless device to which the first wireless device communicates based on the speed of the first wireless device. In some embodiments, selecting a transmission format based on the speed of the first wireless device includes selecting a transmission format based on the relative speed. In some embodiments, the relative speed is the speed of the first wireless device plus an offset speed. In some embodiments, the relative speed is a constant multiplied by the speed of the first wireless device. In some embodiments, a determination of relative speed depends on a type of transmission. In some embodiments, when the type of transmission is point-to-multipoint transmission, the determination of relative speed corresponds to the speed of the first wireless device plus an offset that is based on a predetermined maximum speed of at least a second wireless device. In some embodiments, the selection of the transmission format is further based on one of an application and a service provided by the first wireless device. In some embodiments, the transmission format is selected by at least one of a rule and a table. In some embodiments, the selection of the transmission format is further based on a packet size of a prospective transmission. In some embodiments, the selection of the transmission format is further based on a carrier frequency of the first wireless device. In some embodiments, the selection of the transmission format is further based on a radio measurement directly obtained by one of the first wireless device and a third wireless device other than a second wireless device. In some embodiments, the selected transmission format is at least one of a transport block size, a size of packets to be transmitted, a modulation and coding scheme, an amount of physical resources, a number of resource blocks, a number of transmission subframes, a number of retransmissions and an antenna mapping. In some embodiments, the wireless communication network is a device to device, D2D, communication network. In some embodiments, the first wireless device is one of a vehicle, part of a vehicle and in a vehicle.

According to yet another aspect, a first wireless device for use in a wireless communication network, the first wireless device configured to select a transmission format, is provided. The first wireless device includes, a speed determination module configured to determine a speed of the first wireless device, and a transmission format selection module configured to select a transmission format based on the speed of the first wireless device.

According to this aspect, in some embodiments, selecting a transmission format based on the speed of the first wireless device includes selecting a transmission format based on an absolute speed of the first wireless device.

Further according to this aspect, in some embodiments, the first wireless device includes a relative speed determination module configured to determine a relative speed between the first wireless device and a second wireless device to which the first wireless device communicates based on the speed of the first wireless device. In some embodiments, selecting a transmission format based on the speed of the first wireless device includes selecting a transmission format based on the relative speed. In some embodiments, the wireless communication network is a device to device, D2D, communication network

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to speed dependent transmission format for vehicular transmission to provide resource management of radio communication networks with the participation of vehicles. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

V2x communication may take advantage of a network (NW) infrastructure, when available, but basic V2x connectivity should be possible even in case of lack of network coverage. Providing an LTE-based V2x interface may be economically advantageous because of LTE economies of scale, and it may enable tighter integration between communications with the network infrastructure (V2I, vehicle to infrastructure) and vehicle to pedestrian (V2P) and V2V communications, as compared to using a dedicated V2x technology.

Some embodiments include adopting open-loop link adaptation for a V2x transmitter taking into account, possibly among other parameters, the transmitting vehicle's speed or an equivalent mobility metric. Embodiments may result in significantly improved system level performance as compared with proposed solutions by adaptively selecting the optimal transmission format and thus optimizing spectral efficiency on the link. As used herein, the terms "selecting" and "choosing" are intended to have the same meaning.

Figure 2:
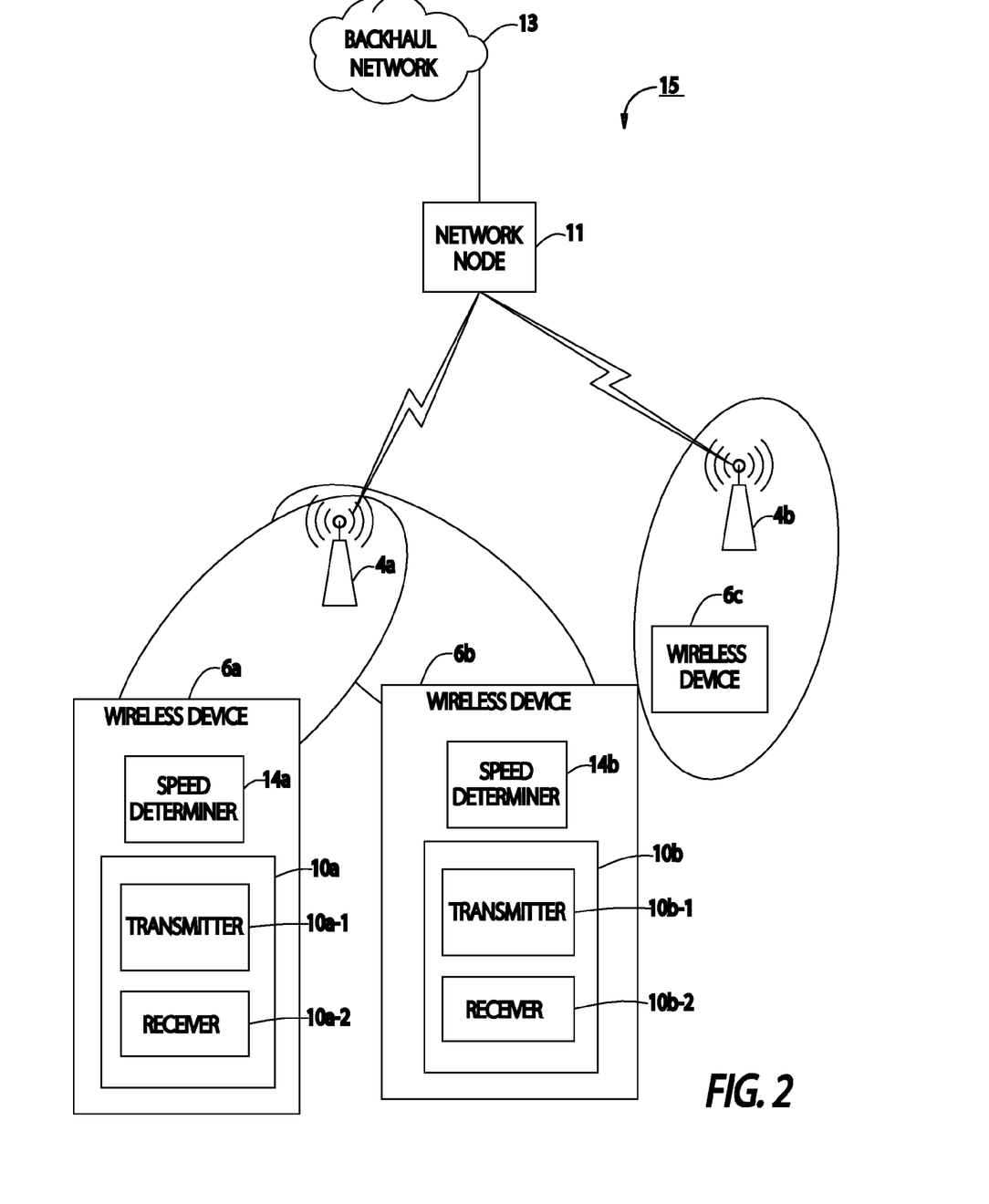
FIG. 2 is a block diagram of a wireless communication system constructed in accordance with principles described herein.

Embodiments are described in the context of D2D communication (sometimes called sidelink, peer to peer, or ProSe) and particularly V2V communication. However, some of the embodiments described herein are applicable to communication among any type of nodes, including e.g. V2I and V2P, and including uplink from some devices to a central control node. FIG. 2 shows a wireless communication system 15 that includes a network node 11 such as a mobile management entity (MME) in communication with a backhaul or core network 13 which may be the Internet and/or a public switched telephone network. The network node 11 is in communication with one or more base stations 4a and 4b, referred to collectively herein as base stations 4, which serve wireless devices 6a, 6b and 6c, referred to collectively herein as wireless devices 6.

Although FIG. 2 shows only three wireless devices, more than two wireless devices are contemplated. In some embodiments, a first wireless device 6a communicates directly with a second wireless device 6b, while receiving measurements from other wireless device such as wireless device 6c. Each wireless device 6 may have a speed determiner 14a or 14b, referred to collectively herein, as speed determiners 14, which function as described below. Each wireless device 4a and 4b may have a transceiver 10a and 10b, respectively, referred to collectively herein as transceivers 10. Transceiver 10a has a transmitter 10a-1 and a receiver 10a-2. Transceiver 10b has a transmitter 10b-1 and a receiver 10b-2. It is understood that the transceiver 10b can be implemented as separate transmitter and receiver elements.

The term wireless device or mobile terminal used herein may refer to any type of wireless device 6 communicating with a network node such as a base station 4 and/or with another wireless device in a cellular or mobile communication system. Examples of a wireless device 6 are user equipment (UE), target device, device to device (D2D) wireless device, V2x wireless device, machine type wireless device or wireless device capable of machine to machine (M2M) communication, PDA, tablet, smart phone, laptop embedded equipped (LEE), laptop mounted equipment (LME), USB dongle, etc.

The term base station, e.g. a Radio Base Station (RBS), sometimes may be referred to herein as, e.g., evolved NodeB "eNB", "eNodeB", "NodeB", "B node", or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station 4 at a base station site. One base station 4, situated on the base station site, may serve one or several cells. Further, each base station may support one or several communication technologies. The base stations 4 communicate over the air interface operating on radio frequencies with the wireless devices 6 within range of the base stations. In the context of this disclosure, downlink (DL) refers to the transmission path from the base station 4 to the wireless device 6. Uplink (UL) refers to the transmission path in the opposite direction, i.e., from the wireless device 6 to the base station 4.

In 3GPP LTE, base stations 4 may be directly connected to one or more core networks 13. Further, although embodiments are described with reference to base stations 4, it is understood that embodiments can be implemented in or across any suitable network node, of which base stations are a type.

D2D communications are currently under study and standardization as a technology enabler for V2V communication systems. Establishing one-to-many D2D communications provides challenges to the management of control information messages. In particular, all decoders of devices receiving a data packet should know at least some of the parameters that were used for encoding the data packet (e.g., time-frequency resources, etc.). One commonly adopted solution requires that the transmitter explicitly inform all receivers about the parameters used to transmit the data packet as part of associated control information (e.g., using a scheduling assignment (SA)).

This disclosure provides an arrangement for determining how to select or choose the most suitable transmission format at the transmitter. Conventional link adaptation techniques often adopted in wireless systems take advantage of measurements at the receiver and some signaling between the nodes. However, this is impractical for V2x communication due to latency and signaling overhead in one-to-many transmission. Thus, some embodiments perform link adaptation implicitly by selecting or choosing a transmission format that is based only on information available at the transmitter without reliance on information obtained from the intended receiver(s).

The "optimal" transmission format may be defined as the transmission format that utilizes the minimum amount of radio resources, e.g., bandwidth, time, transmitted energy, number of resource blocks or re-transmissions etc., while still fulfilling the radio requirements, e.g., range, latency, for a given message to be transmitted. In practical systems, the optimal format is constrained to supported formats and also by any other system and implementation related constraints. The objective of link adaptation is to select a transmission format that is as close as possible to the optimal one, based on the information and capabilities that are available.

It is noted that the optimal transmit format is a function of different parameters, including, without limitation:
  Size of the packet to be transmitted and other traffic related constraints or requirements (receiver(s) of the packet, expected range of the packet, acceptable latency, etc.);
  Propagation properties of the radio channel between the transmitter and receiver(s), including, e.g., path loss and fading effects, including impact of relative mobility between the transmitter and receiver(s); and
  Level of interference in the system, which affects the achievable signal to interference plus noise ratio (SINR) at the receiver.

The size of the packet to be transmitted and certain other traffic related constraints or requirements are clearly known at the transmitter. The other aspects are related to propagation and radio conditions between the transmitter and the receiver and are in general not known at the transmitter, unless a feedback channel reporting measurement performed at the receiver is introduced. In some embodiments, rather than relying on a feedback channel, estimating mobility at the transmitter may be performed instead of estimating the channel between the transmitter and the receiver.

Some embodiments include methods and arrangements for:
  Estimating mobility, radio and/or propagation properties of the radio channel between the transmitter and the receiver(s) based solely on information available at the transmitter, without relying on information from the receivers.
  Selecting the optimal or most suitable transmission format based on the mobility information and a packet's characteristics (e.g., the size of the packet to be transmitted and other traffic related constraints or requirements). These properties, e.g., interference, network load, etc., may be directly obtained by the first wireless devices or obtained by another wireless device (other than the intended receivers) such as a base station, and reported to the first wireless device.
  Transmitting by communicating, e.g., directly communicating, or broadcasting the packet using the selected transmission format. The transmission format may include transport block size, size of the packets to be transmitted, the modulation and coding scheme (MCS), antenna mapping and/or the amount of physical resources used, such as the number of resource blocks (RBs), the allocation of resource blocks, the number of transmission subframes, and/or number of retransmissions. Typically the number of retransmissions, the number of times the transmission of a packet is repeated, is two times.

Embodiments estimate mobility between the transmitter 10*a*-1 of a first wireless device 6*a* and a receiver 10*b*-2 of a second wireless device 6*b* based on mobility measurements at the transmitter 10*a*-1 and may further be based on the transmitter's absolute speed or a relative speed between the first and second wireless devices 6*a* and 6*b*. In one example, the transmitter 10*a*-1 of a first wireless device 6*a* obtains information about its own speed, e.g., using a global positioning system (GPS) receiver, measurements within a vehicle carrying the wireless device, an accelerometer or similar device, radio measurements involving trilateration, reading information from V2x packets or any other method. Based on the information about the transmitter's speed, the transmitter may estimate the relative speed between the transmitter and receiver.

There may be cases, for example, where a second wireless device is not moving or the speed of the second wireless device is unknown. In one example, the estimate of the relative speed of a wireless device 6, which may be in some cases a V2x device, can simply be the transmitter speed itself. In other words, the relative speed may be deemed to be the absolute speed of the wireless device 6. In another example, the relative speed is assumed to be twice the absolute speed of the wireless device 6, or some other multiplicative factor times the absolute speed of the wireless device. In a further example, the relative speed is estimated to be the absolute speed of the wireless device 6 plus a certain offset. The relative speed determination method as well as the offset mentioned above can be a function of the type of transmission and service. For example, when transmitting in a point-to-point fashion towards a deployed node, the estimated relative speed may correspond to the absolute speed of the wireless device 6. As another example, when transmitting in a point-to-multipoint fashion towards wireless devices, the estimated relative speed may correspond to the absolute speed of the wireless device plus an offset that reflects the reasonable maximum speed of the other wireless devices. The reasonable maximum speed may be based on an applicable speed limit.

A practical implementation can be obtained by using a rule or equivalently a table, where for each combination of the speed of the wireless device and packet size (in case multiple packet sizes are supported), a preferred transmission format, also referred to as a transmission parameter, is selected. As mentioned above, the transmission format may include transport block size, size of the packets to be transmitted, the modulation and coding, the amount of physical resources used, number of retransmissions and/or antenna mapping.

Multiple tables and/or rules may be defined for different applications and/or services as well as for different carrier frequencies, noting that the Doppler spread depends also on the carrier frequency. Additionally, system bandwidth and other system parameters can be considered in the table as a basis for selecting the appropriate transmission format. Additional parameters may be considered in the rule/table, such as measured large scale properties of the radio channel such as the average delay spread.

In a further embodiment, the level of interference and/or traffic load in the network is considered for selecting the most suitable transmission format. This information is again obtained at the transmitter, e.g., by radio measurements. Possibly, information obtained from the network via any type of signaling can be used for assessing the level of traffic load and/or interference. Traffic load information and interference information may be received by a nearby base station in communication with the wireless device.

Figure 3:
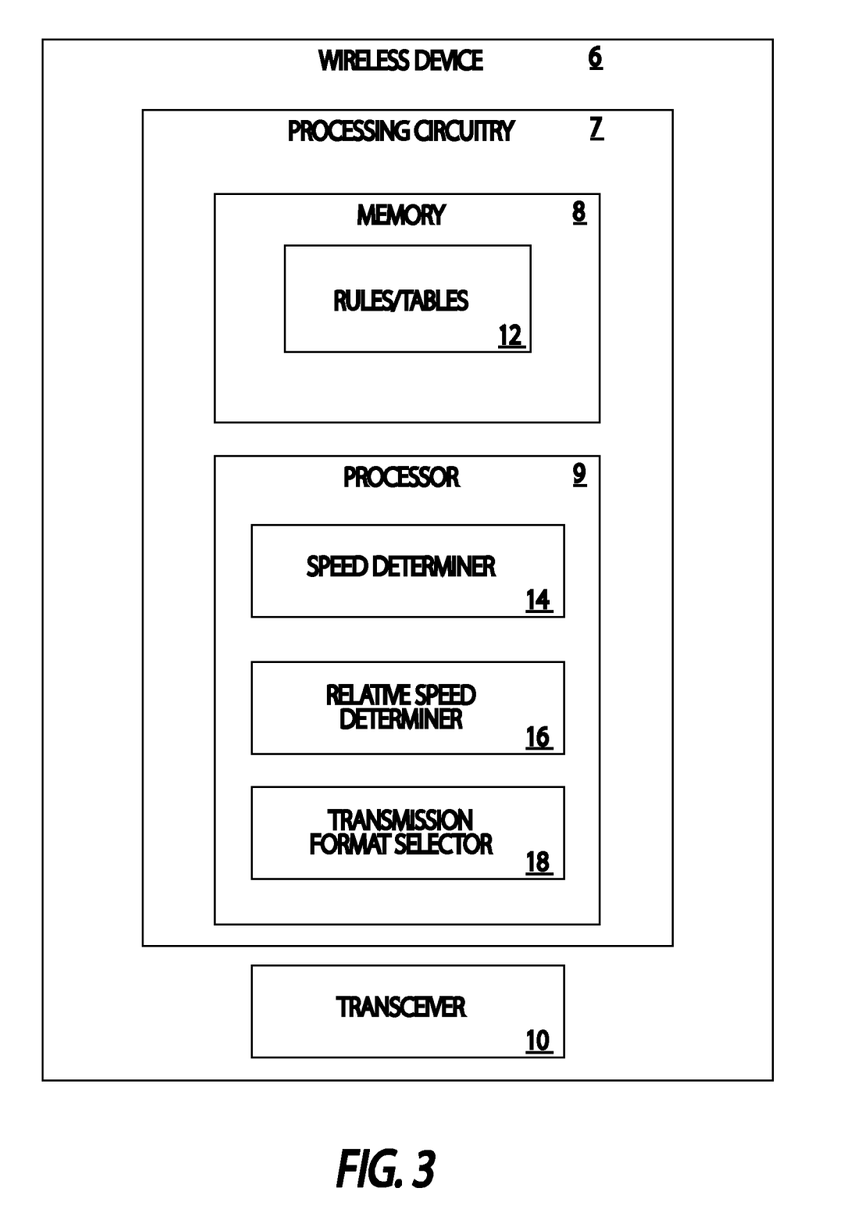
FIG. 3 is a block diagram of a wireless device configured to determine a speed-dependent transmission format.

A block diagram of an embodiment of a wireless device 6 configured to choose a transmission format for communication from the wireless device 6 to another wireless device, when there may be relative motion between the wireless devices, is shown in FIG. 3 Wireless device 6 can be a device used for D2D or wireless communication. Wireless device 6 includes processing circuitry 7, which includes a memory 8 and a processor 9. The wireless device 6 also includes a transceiver 10.

The memory 8 is configured to store at least one of a rule and a table 12 providing correlation between relative speeds and preferred transmission formats. Thus, for example, for a given relative speed, a particular preferred transmission format may be indicated by a rule or table entry. For example, when a relative speed between a first wireless device 6a and a second wireless device 6b is relatively high, the transmission format may include smaller transport block size, smaller packets sizes, or a lower level of modulation and coding. Conversely, when a relative speed between the first wireless device 6a and a second wireless device 6b is relatively low, the transmission format may include larger transport block size, larger packets sizes, or a higher level of modulation and coding, for example.

The processor 9 executes software that may be stored in the memory 8 to implement transmission format selection functions. A speed determiner 14 determines a speed of the wireless device 6 via of the GPS or an accelerometer, for example. A relative speed determiner 16 determines a relative speed between the wireless device 6a and another wireless device 6b based on the speed of the wireless device 6a. For example, the relative speed may be a constant speed added to the determined speed of the first wireless device 6a. As mentioned above, the relative speed determination method as well as the offset can be a function of the type of transmission and service. For example, when transmitting in a point-to-point fashion towards a second wireless device 6b, the estimated relative speed may correspond to the absolute speed of the first wireless device 6a. As another example, when transmitting in a point-to-multipoint fashion towards mobile wireless devices 6, the estimated relative speed may correspond to the absolute speed of the first wireless device 6a plus an offset that reflects the reasonable maximum speed of other wireless devices 6.

The processor 9 also implements a transmission format selector 18 that selects a preferred transmission format based on the relative speed. The selection may be according to a rule that maps the relative speed to a transmission format or according to a table of relative speeds and transmission formats. The transceiver 10 transmits according to the selected transmission format.

As noted, the relative speed can be selected as one of the absolute speed of the transmitting wireless device, a difference in speed between the transmitting wireless device 6a and a receiving wireless device 6b, the absolute speed of the transmitting wireless device 6a plus an offset value, the absolute speed of the transmitting wireless device 6a multiplied by a constant, etc. The offset value may be an estimated speed of the receiving wireless device 6b, an estimated speed of a fastest wireless device 6 as determined at a base station 4, etc.

In addition to a traditional processor and memory, processing circuitry 7 may comprise integrated circuitry for processing and/or control, e.g., one or more processors and/or processor cores and/or FPGAs (Field Programmable Gate Array) and/or ASICs (Application Specific Integrated Circuitry). Processing circuitry 7 may comprise and/or be connected to and/or be adapted for accessing (e.g., writing to and/or reading from) memory 8, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 8 may be adapted to store code executable by control circuitry and/or other data, e.g., data pertaining to communication, e.g., configuration and/or address data of nodes, etc. Processing circuitry 7 may be configured to control any of the methods described herein and/or to cause such methods to be performed, e.g., by wireless device 6. Corresponding instructions may be stored in the memory 8, which may be readable and/or readably connected to the processor 9. In other words, processing circuitry 7 may include a controller, which may comprise a microprocessor and/or microcontroller and/or FPGA (Field-Programmable Gate Array) device and/or ASIC (Application Specific Integrated Circuit) device. It may be considered that processing circuitry 7 includes or may be connected or connectable to memory, which may be adapted to be accessible for reading and/or writing by the controller and/or processing circuitry 7.

Figure 4:
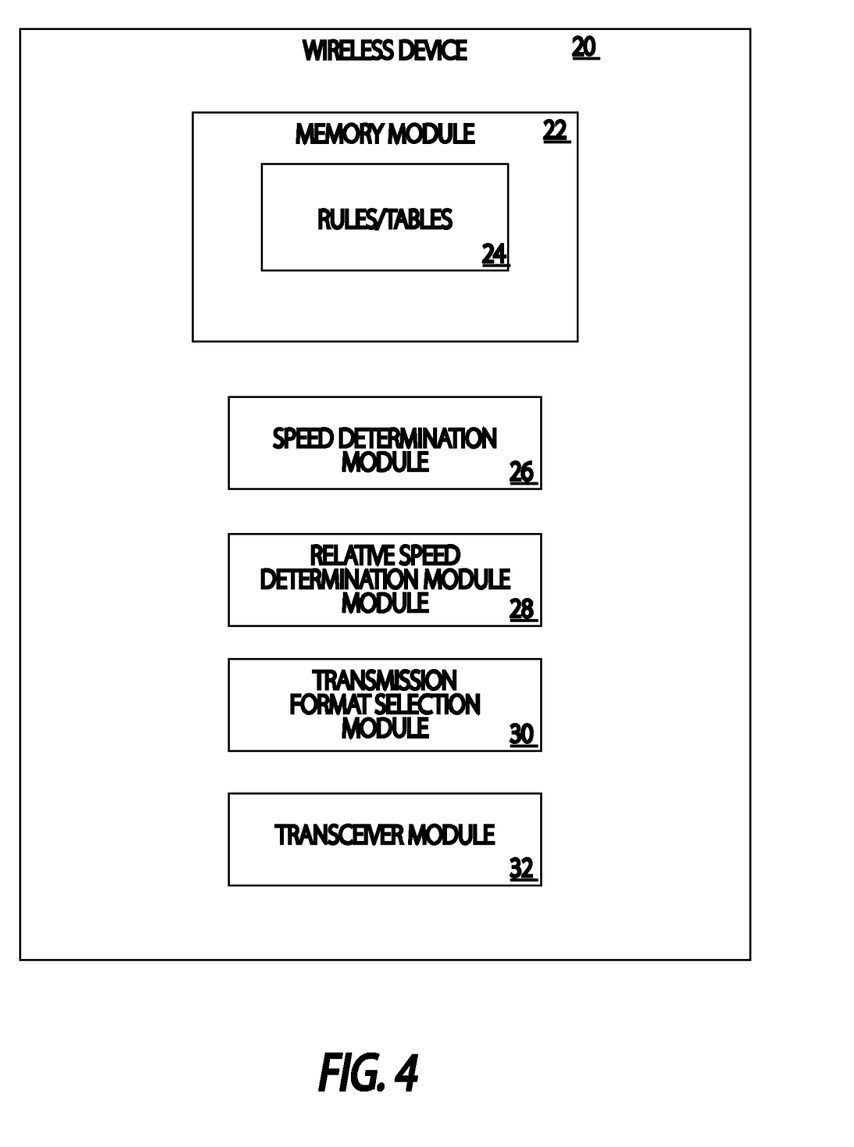
FIG. 4 is an alternative block diagram of a wireless device configured to determine a speed-dependent transmission format.

FIG. 4 is a block diagram of an alternative embodiment of a wireless device 20 configured to choose a transmission format for communication from the wireless device 20 to another wireless device, when there may be relative motion between the wireless devices. The wireless device 20 may include a memory module 22 that is configured to store rules or tables 24 for determining a transmission format based on a relative speed and possibly also based on a packet size for a prospective transmission, an application or service running on the wireless device 20 and a carrier frequency of the prospective transmission. The wireless device 20 may also include software modules that, when executed by a processor, perform the functions described herein for selecting a transmission format. A speed determination module 26 is configured to determine a speed of the wireless device 20. A relative speed determination module 28 is configured to determine a relative speed between the wireless device 20 and a second wireless device based on the speed of the wireless device 20. A transmission format selection module 30 is configured to select by at least one of a rule and a table, a preferred transmission format based on the relative speed. A transceiver module 32, which may be implemented in whole or in part as software executed by a processor transmits according to the selected transmission format.

Figure 5:
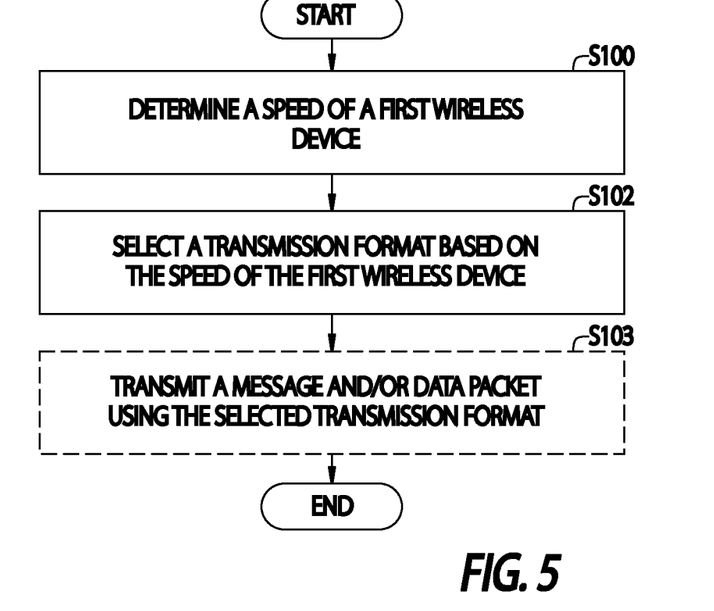
FIG. 5 is a first flowchart of an exemplary process for selecting a speed-dependent transmission format.

FIG. 5 is a flowchart of an exemplary process for choosing a transmission format for communication between wireless devices. The process includes determining a speed of the first wireless device 6a (block S100). This determination may be made by an onboard GPS or accelerometer, for example. The process also includes selecting a transmission format based on the speed of the first wireless device 6a (block S102). The process also optionally includes transmitting one or more of a message and a data packet using the selected transmission format (block S103).

Figure 6:
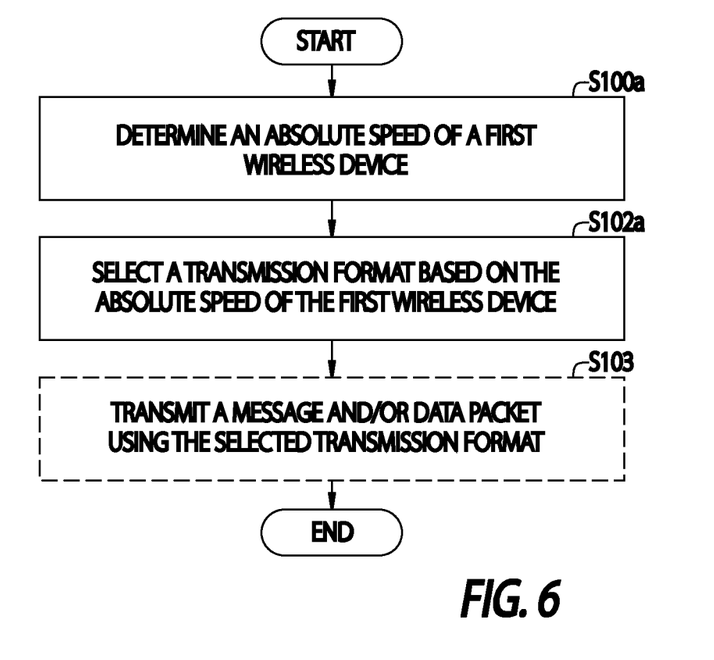
FIG. 6 is a second flowchart of an exemplary process for selecting a speed-dependent transmission format.

FIG. 6 is a more detailed flowchart of an exemplary process for choosing a transmission format for communication between wireless devices. An absolute speed of a first wireless device 6a is determined by the speed determiner 14 (block S100a). The process includes selecting a transmission format based on the absolute speed via the transmission format selector 18 (block S102a). The process also optionally includes transmitting one or more of a message and a data packet using the selected transmission format (block S103).

Figure 7:
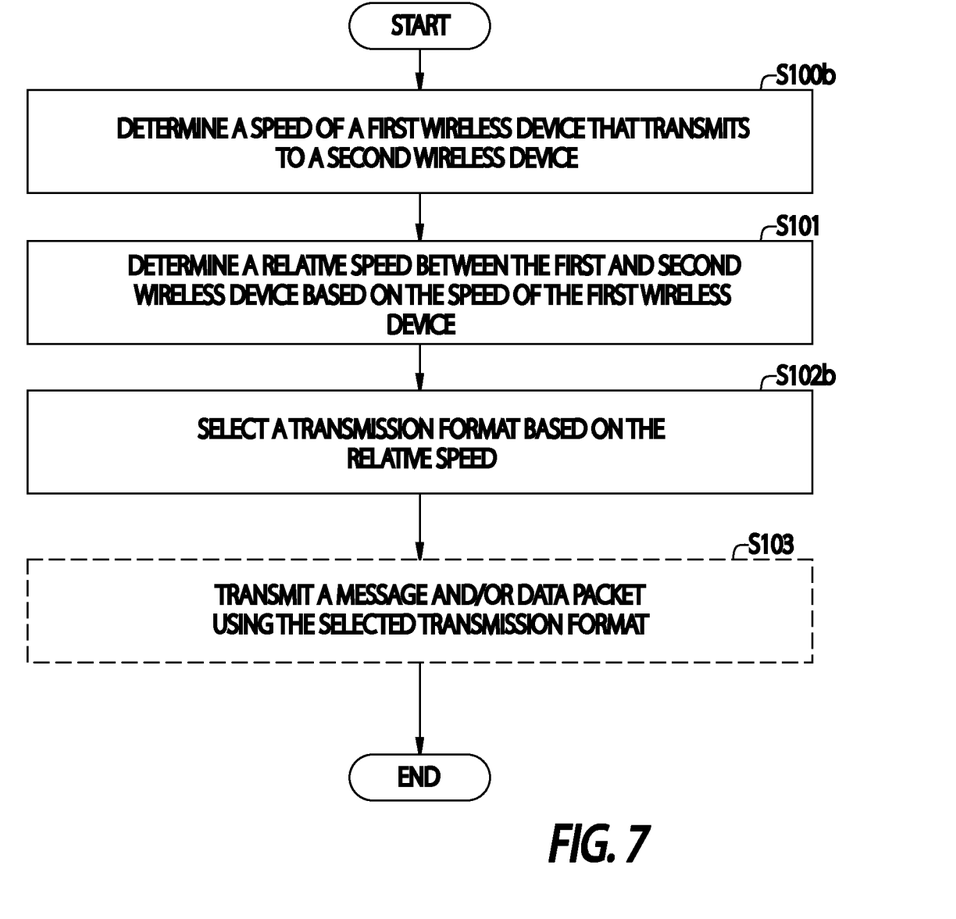
FIG. 7 is a third flowchart of an exemplary process for selecting a speed-dependent transmission format.

FIG. 7 is a more detailed flowchart of an exemplary process for choosing a transmission format for communication between wireless devices 6 having relative motion between the wireless devices 6. A speed of a first wireless device 6a transmitting to one or more other wireless devices 6b is determined by the speed determiner 14 (block S100b). A relative speed between the first wireless device 6a and a second wireless device 6b is determined based on the speed of the first wireless device 6a by the relative speed determiner 16 (block S101). The process includes selecting a transmission format based on the relative speed via the transmission format selector 18 (block S102b). The process also optionally includes transmitting one or more of a message and a data packet using the selected transmission format (block S103). As noted above, the relative speed may be equal to the speed of the first wireless device 6a, or the speed of the first wireless device 6a plus an offset speed, or a constant times the speed of the first wireless device 6a.

In addition to, or instead of, basing the selection of the transmission format on the relative speed between the wireless device 6a and another wireless device 6b, the selection of the transmission format may be based on a packet size of a prospective transmission, based on an application or service running on the wireless device 6a, and/or based on a carrier frequency of the prospective transmission by the wireless device 6a. For example, when the transmission format is based on a packet size, a larger packet size may result in a higher transport block size or a lower level of modulation and coding, for example. Similarly, some applications, such as a combination of video and voice, may require greater physical resources such as time and bandwidth. Further, the higher the carrier frequency, the lower the level of modulation and coding, in some embodiments.

Thus, some embodiments adopt open-loop link adaptation for the wireless transmitter taking into account, possibly among other parameters, the transmitter speed or equivalent mobility metric.

Embodiments advantageously provide a method and device for choosing a transmission format for one of broadcasting and communication between wireless devices when there is relative motion between the wireless devices such as between a first wireless device and a second wireless device. According to one aspect, an embodiment provides determining a speed of a first wireless device, determining a relative speed between the first wireless device and the second wireless device based on the speed of the first wireless device and selecting, by at least one of a rule and a table, a transmission format based on the relative speed.

According to this aspect, in some embodiments, the method further comprises the one of communicating and broadcasting one of a message and a data packet using the selected transmission format. In some embodiments, the relative speed is the speed of the first wireless device. In some embodiments, the relative speed is the speed of the first wireless device plus an offset speed. In some embodiments, the relative speed is a constant times the speed of the first wireless device. In some embodiments, the transmission format is further based on a packet size of a prospective transmission. In some embodiments, the transmission format is further based on one of an application and a service provided by the first wireless device. In some embodiments, the transmission format is further based on a carrier frequency of the first wireless device. In some embodiments, the transmission format is further based on a radio measurement directly obtained by one of the first wireless device and another wireless device other than the second wireless device which reports the radio measurement to the first wireless device.

According to another aspect, some embodiments provide a first wireless device configured to choose a transmission format for one of broadcasting and communication from the first wireless device to a second wireless device. The wireless device includes processing circuitry including a memory and a processor. The memory is configured to store at least one of a rule and a table providing a correlation between relative speeds and transmission formats. The processor is configured to: determine a speed of the first wireless device; determine a relative speed between the first wireless device and the second wireless device based on the speed of the first wireless device; and select by the at least one of a rule and a table, a transmission format based on the relative speed. In some embodiments, the processor is further configured to broadcast one of a message and a data packet using the selected transmission format. In some embodiments of this aspect, the relative speed is the speed of the first wireless device. In some embodiments of this aspect, the relative speed is the speed of the first wireless device plus an offset speed. In some embodiments of this aspect, the relative speed is a constant multiplied by the speed of the first wireless device. In some embodiments of this aspect, the preferred transmission format is further based on a packet size of a prospective transmission. In some embodiments of this aspect, the preferred transmission format is further based on one of an application and a service provided by the first wireless device. In some embodiments of this aspect, the preferred transmission format is further based on a carrier frequency of the first wireless device. In some embodiments, the transmission format is further based on a radio measurement directly obtained by one of the first wireless device and another wireless device other than the second wireless device which reports the radio measurement to the first wireless device.

According to yet another aspect, some embodiments provide a first wireless device configured to choose a transmission format for one of broadcasting and communication from the first wireless device to a second wireless device. The first wireless device includes a speed determination module configured to determine a speed of the first wireless device; a relative speed determination module configured to determine a relative speed between the first wireless device and the second wireless device based on the speed of the first wireless device; and a transmission format selection module configured to select by at least one of a rule and a table, a transmission format based on the relative speed.

Some other embodiments are as follows:

Embodiment 1

A method of choosing a transmission format for one of broadcasting and communication between a first wireless device and a second wireless device, when there is relative motion between the first wireless device and the second wireless device, the method comprising:

determining a speed of a first wireless device;

determining a relative speed between the first wireless device and the second wireless device based on the determined speed of the first wireless device; and selecting by at least one of a rule and a table, a transmission format based on the relative speed.

Embodiment 2

The method of Embodiment 1, further comprising the one of communicating and broadcasting one of a message and a data packet using the selected transmission format.

Embodiment 3

The method of Embodiment 1, wherein the relative speed is the speed of the first wireless device, i.e., the absolute speed of the first wireless device.

Embodiment 4

The method of Embodiment 1, wherein the relative speed is the speed of the first wireless device plus an offset speed.

Embodiment 5

The method of Embodiment 1, wherein the relative speed is a constant multiplied by the speed of the first wireless device.

Embodiment 6

The method of Embodiment 1, wherein the transmission format is further based on a packet size of a prospective transmission.

Embodiment 7

The method of Embodiment 1, wherein the transmission format is further based on one of an application and a service provided by the first wireless device.

Embodiment 8

The method of Embodiment 1, wherein the transmission format is further based on a carrier frequency of the first wireless device.

Embodiment 9

The method of Embodiment 1, wherein the transmission format is further based on a radio measurement directly obtained by one of the first wireless device and another wireless device other than the second wireless device which reports the radio measurement to the first wireless device.

Embodiment 10

A first wireless device configured to choose a transmission format for one of broadcasting and communication from the first wireless device to a second wireless device, the first wireless device comprising:
  processing circuitry including a memory and a processor:
    the memory configured to store at least one of a rule and a table providing a correlation between relative speeds and transmission formats; and
    the processor configured to:
      determine a speed of the first wireless device;
      determine a relative speed between the first wireless device and the second wireless device based on the speed of the first wireless device; and
      select by the at least one of a rule and a table, a transmission format based on the relative speed.

Embodiment 11

The first wireless device of Embodiment 10, wherein the processor is further configured to one of communicate and broadcast one of a message and a data packet using the selected transmission format.

Embodiment 12

The first wireless device of Embodiment 10, wherein the relative speed is the speed of the first wireless device.

Embodiment 13

The first wireless device of Embodiment 10, wherein the relative speed is the speed of the first wireless device plus an offset speed.

Embodiment 14

The first wireless device of Embodiment 10, wherein the relative speed is a constant multiplied by the speed of the first wireless device.

Embodiment 15

The first wireless device of Embodiment 10, wherein the transmission format is further based on a packet size of a prospective transmission.

Embodiment 16

The first wireless device of Embodiment 10, wherein the transmission format is further based on one of an application and a service provided by the first wireless device.

Embodiment 17

The first wireless device of Embodiment 10, wherein the transmission format is further based on a carrier frequency of the first wireless device.

Embodiment 18

The first wireless device of Embodiment 10, wherein the transmission format is further based on a radio measurement directly obtained by one of the first wireless device and another wireless device other than the second wireless device which reports the radio measurement to the first wireless device.

Embodiment 19

A first wireless device configured to choose a transmission format for one of broadcasting and communication from the first wireless device to a second wireless device, the first wireless device comprising:
  a speed determination module configured to determine a speed of the first wireless device;
  a relative speed determination module configured to determine a relative speed between the first wireless device and the second wireless device based on the speed of the first wireless device; and a transmission format selection module configured to select by at least one of a rule and a table, a transmission format based on the relative speed.

Thus, some embodiments advantageously provide a method and system for selecting or choosing a transmission format of a first wireless device 6a in a wireless communication network. According to one aspect, a method for use in a wireless device for selecting a transmission format of the first wireless device includes determining a speed of the first wireless 6a device, and selecting a transmission format based on the speed of the first wireless device 6a.

According to this aspect, in some embodiments, the method further includes transmitting, to at least a second wireless device 6b or network node, one of a message and a data packet using the selected transmission format. In some embodiments, the transmitting is one of communicating, broadcasting and direct communicating, such as, where the communicating is direct communicating, transmitting a direct message in a D2D communication network. In some embodiments, the speed of the first wireless device 6a is an absolute speed of the first wireless device 6a. In some embodiments, selecting a transmission format based on the speed of the first wireless device 6a includes selecting a transmission format based on the absolute speed of the first wireless device 6a. In some embodiments, the method further includes determining a relative speed between the first wireless device 6a and a second wireless device 6b, to which the first wireless device 6a communicates, based on the determined speed of the first wireless device 6a. In some embodiments, selecting a transmission format based on the speed of the first wireless device 6a includes selecting a transmission format based on the relative speed. In some embodiments, the determined relative speed is the speed of the first wireless device 6a plus an offset speed. In some embodiments, the determined relative speed is a constant multiplied by the speed of the first wireless device 6a. In some embodiments, the determination of relative speed depends on a type of transmission. In some embodiments, when the type of transmission is point-to-multipoint transmission, the determination of relative speed corresponds to a speed of the first wireless device 6a plus an offset that is based on a predetermined speed of one or more other wireless devices including the second wireless device 6b. In some embodiments, the selection of the transmission format is further based on one of an application and a service provided by the first wireless device 6a. In some embodiments, the transmission format is selected by at least one of a rule and a table. In some embodiments, the selection of the transmission format is further based on a packet size of a prospective transmission. In some embodiments, the selection of the transmission format is further based on a carrier frequency of the first wireless device 6a. In some embodiments, the selection of the transmission format is further based on a radio measurement directly obtained by one of the first wireless device 6a and a third wireless device 6c, other than a second wireless device, 6b to which the first wireless device 6a communicates. In some embodiments, the selected transmission format is at least one of a transport block size, a size of packets to be transmitted, a modulation and coding scheme (MCS), an amount of physical resources, a number of resource blocks (RBs), a number of transmission subframes, a number of retransmissions and an antenna mapping. In some embodiments, the first wireless device 6a is one of a vehicle, part of a vehicle and in a vehicle. In some embodiments, the wireless communication network is a device to device, D2D, communication network.

According to another aspect, a first wireless device 6a for use in a wireless communication network, the first wireless device 6a being configured to select a transmission format is provided. The first wireless device 6a includes processing circuitry, including a memory and a processor. The memory is configured to store transmission formats. The processing circuitry, or the processor of the processing circuitry, is configured to determine a speed of the first wireless device 6a, and select a transmission format for the first wireless device 6a based on the speed of the first wireless device 6a.

According to this aspect, in some embodiments, a transmitter is configured to transmit one of a message and a data packet using the selected transmission format. In some embodiments, a transmitter is configured to transmit one of a message and a data packet using the selected transmission format to at least a second wireless device 6b. In some embodiments, the speed of the first wireless device 6a is an absolute speed of the first wireless device 6a. In some embodiments, selecting a transmission format based on the speed of the first wireless device 6a includes selecting a transmission format based on the absolute speed of the first wireless device 6a. In some embodiments, the processing circuitry, or the processor of the processing circuitry, is further configured to determine a relative speed between the first wireless device 6a and a second wireless device 6b to which the first wireless device 6a communicates based on the speed of the first wireless device 6a. In some embodiments, selecting a transmission format based on the speed of the first wireless device 6a includes selecting a transmission format based on the relative speed. In some embodiments, the relative speed is the speed of the first wireless device 6a plus an offset speed. In some embodiments, the relative speed is a constant multiplied by the speed of the first wireless device 6a. In some embodiments, a determination of relative speed depends on a type of transmission. In some embodiments, when the type of transmission is point-to-multipoint transmission, the determination of relative speed corresponds to the speed of the first wireless device 6a plus an offset that is based on a predetermined speed of at least a second wireless device 6b, and wherein the predetermined speed of the second wireless device 6b is a predetermined maximum speed of the second wireless device 6b. In some embodiments, the selection of the transmission format is further based on one of an application and a service provided by the first wireless device 6a. In some embodiments, the transmission format is selected by at least one of a rule and a table. In some embodiments, the selection of the transmission format is further based on a packet size of a prospective transmission. In some embodiments, the selection of the transmission format is further based on a carrier frequency of the first wireless device 6a. In some embodiments, the selection of the transmission format is further based on a radio measurement directly obtained by one of the first wireless device 6a and a third wireless device 6c, other than a second wireless device 6b to which the first wireless device 6a communicates. In some embodiments, the selected transmission format is at least one of a transport block size, a size of packets to be transmitted, a modulation and coding scheme, an amount of physical resources, a number of resource blocks, a number of transmission subframes, a number of retransmissions and an antenna mapping. In some embodiments, the wireless communication network is a device to device, D2D, communication network.

According to yet another aspect, a first wireless device 6a for use in a wireless communication network, the first wireless device 6a configured to select a transmission format, is provided. The first wireless device 6a includes, a speed determination module configured to determine a speed of the first wireless device 6a, and a transmission format selection module configured to select a transmission format based on the speed of the first wireless device 6a.

According to this aspect, in some embodiments, selecting a transmission format based on the speed of the first wireless device includes selecting a transmission format based on an absolute speed of the first wireless device.

Further according to this aspect, in some embodiments, the first wireless device 6a includes a relative speed determination module configured to determine a relative speed between the first wireless device 6a and a second wireless device 6b to which the first wireless device 6a communicates based on the speed of the first wireless device 6a. In some embodiments, selecting a transmission format based on the speed of the first wireless device 6a includes selecting a transmission format based on the relative speed. In some embodiments, the wireless communication network is a device to device, D2D, communication network As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for use in a wireless device of selecting a transmission format of a first wireless device in a wireless communication network, the method comprising:
 determining a speed of the first wireless device; and
 selecting one of a plurality of transmission formats for link adaptation for the first wireless device based on information available at the first wireless device without reliance on information from a second wireless device, the first wireless device being a transmitter device and the second wireless device being an intended receiver device, the information available at the first wireless device including at least the speed of the first wireless device and the selected transmission format comprises a modulation and coding scheme.

2. The method of claim 1, further comprising:
 transmitting one of a message and a data packet using the selected transmission format.

3. The method of claim 2, wherein the transmitting is one of communicating, broadcasting and direct communicating.

4. The method of claim 1, wherein the speed of the first wireless device is an absolute speed of the first wireless device.

5. The method of claim 1, wherein selecting a transmission format based on the speed of the first wireless device includes selecting a transmission format based on the absolute speed of the first wireless device.

6. The method of claim 1, further comprising determining a relative speed between the first wireless device and a second wireless device based on the determined speed of the first wireless device.

7. The method of claim 6, wherein selecting a transmission format based on the speed of the first wireless device includes selecting a transmission format based on the relative speed.

8. The method of claim 1, wherein the determined relative speed is the speed of the first wireless device plus an offset speed.

9. The method of claim 6, wherein the determined relative speed is a constant multiplied by the speed of the first wireless device.

10. The method of claim 6, wherein the determination of relative speed depends on a type of transmission.

11. The method of claim 10, wherein, when the type of transmission is point-to-multipoint transmission, the determination of relative speed corresponds to a speed of the first wireless device plus an offset that is based on a predetermined speed of at least one other wireless devices including the second wireless device.

12. The method of claim 1, wherein the selection of the transmission format is further based on one of an application and a service provided by the first wireless device.

13. The method of claim 1, wherein the transmission format is selected by at least one of a rule and a table.

14. The method of claim 1, wherein the selection of the transmission format is further based on a packet size of a prospective transmission.

15. The method of claim 1, wherein the selection of the transmission format is further based on a carrier frequency of the first wireless device.

16. The method of claim 1, wherein the selection of the transmission format is further based on a radio measurement directly obtained by one of the first wireless device and a third wireless device other than a second wireless device.

17. The method of claim 1, wherein the selected transmission format further comprises at least one of a transport block size, a size of packets to be transmitted, an amount of physical resources, a number of resource blocks, a number of transmission subframes, a number of retransmissions and an antenna mapping.

18. The method of claim 1, wherein the first wireless device is one of a vehicle, part of a vehicle and in a vehicle.

19. The method of claim 1, wherein the wireless communication network is a device to device, D2D, communication network.

20. A first wireless device for use in a wireless communication network, the first wireless device being configured to select a transmission format, the first wireless device comprising:
processing circuitry configured to:
determine a speed of the first wireless device; and
select one of a plurality of transmission formats for link adaptation for the first wireless device based on information available at the first wireless device without reliance on information from a second wireless device, the first wireless device being a transmitter device and the second wireless device being an intended receiver device, the information available at the first wireless device including at least the speed of the first wireless device and the selected transmission format comprises a modulation and coding scheme.

21. The first wireless device of claim 20, further comprising a transmitter configured to transmit one of a message and a data packet using the selected transmission format.

22. The first wireless device of claim 20, wherein the speed of the first wireless device is an absolute speed of the first wireless device.

23. The first wireless device of claim 20, wherein selecting a transmission format based on the speed of the first wireless device includes selecting a transmission format based on an absolute speed of the first wireless device.

24. The first wireless device of claim 20, wherein the processing circuitry is further configured to determine a relative speed between the first wireless device and a second wireless device to which the first wireless device communicates based on the speed of the first wireless device.

25. The first wireless device of claim 24, wherein selecting a transmission format based on the speed of the first wireless device includes selecting a transmission format based on the relative speed.

26. The first wireless device of claim 24, wherein the relative speed is the speed of the first wireless device plus an offset speed.

27. The first wireless device of claim 24, wherein the relative speed is a constant multiplied by the speed of the first wireless device.

28. The first wireless device of claim 24, wherein the determination of relative speed depends on a type of transmission.

29. The first wireless device of claim 28, wherein, when the type of transmission is point-to-multipoint transmission, the determination of relative speed corresponds to the speed of the first wireless device plus an offset that is based on a predetermined maximum speed of at least a second wireless device.

30. The first wireless device of claim 20, wherein the selection of the transmission format is further based on one of an application and a service provided by the first wireless device.

31. The first wireless device of claim 20, wherein the transmission format is selected by at least one of a rule and a table.

32. The first wireless device of claim 20, wherein the selection of the transmission format is further based on a packet size of a prospective transmission.

33. The first wireless device of claim 20, wherein the selection of the transmission format is further based on a carrier frequency of the first wireless device.

34. The first wireless device of claim 20, wherein the selection of the transmission format is further based on a radio measurement directly obtained by one of the first wireless device and a third wireless device other than a second wireless device.

35. The first wireless device of claim 20, wherein the selected transmission format further comprises at least one of a transport block size, a size of packets to be transmitted, an amount of physical resources, a number of resource blocks, a number of transmission subframes, a number of retransmissions and an antenna mapping.

* * * * *